(12) United States Patent
Amsz et al.

(10) Patent No.: US 12,202,540 B2
(45) Date of Patent: Jan. 21, 2025

(54) BODY FOR AN ELECTRICALLY OPERABLE MOTOR VEHICLE

(71) Applicant: Bayerische Motoren Werke Aktiengesellschaft, Munich (DE)

(72) Inventors: Markus Amsz, Bachenhausen (DE); Jan Danneberg, Munich (DE); Martin Gamboni, Eurasburg (DE); Juergen Leschhorn, Geltendorf (DE); Andreas Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/767,981

(22) PCT Filed: Oct. 16, 2020

(86) PCT No.: PCT/EP2020/079146
§ 371 (c)(1),
(2) Date: Apr. 11, 2022

(87) PCT Pub. No.: WO2021/074356
PCT Pub. Date: Apr. 22, 2021

(65) Prior Publication Data
US 2024/0083508 A1 Mar. 14, 2024

(30) Foreign Application Priority Data
Oct. 16, 2019 (DE) ..................... 10 2019 127 942.9

(51) Int. Cl.
*B62D 21/15* (2006.01)
*B60K 1/04* (2019.01)
*B62D 25/20* (2006.01)

(52) U.S. Cl.
CPC ................ *B62D 21/15* (2013.01); *B60K 1/04* (2013.01); *B62D 25/20* (2013.01); *B60K 2001/0438* (2013.01)

(58) Field of Classification Search
CPC .... B62D 21/15; B62D 25/20; B62D 25/2018; B60K 1/04; B60K 2001/0438; B60Y 2306/01
See application file for complete search history.

(56) References Cited

U.S. PATENT DOCUMENTS

2012/0251862 A1 10/2012 Kano et al.
2012/0282507 A1 11/2012 Andre et al.
(Continued)

FOREIGN PATENT DOCUMENTS

CN 102729791 A 10/2012
CN 102770331 A 11/2012
(Continued)

OTHER PUBLICATIONS

English translation of Chinese Office Action issued in Chinese Application No. 202080065222.5 dated Apr. 11, 2023 (seven (7) pages).

(Continued)

*Primary Examiner* — Paul N Dickson
*Assistant Examiner* — Sara Laghlam
(74) *Attorney, Agent, or Firm* — Crowell & Moring LLP

(57) ABSTRACT

A body for an electrically operable motor vehicle, includes a vehicle floor, which has a floor element arranged above an energy storage device and, in the region of the end of the floor element, at least one fastening point of the body for a support element is provided. In the event of an accident-induced load introduction of a corresponding force in the region of the fastening point, in order to prevent accompanying damage to the energy storage device, the floor element
(Continued)

has a deformation region that can be intentionally deformed away from the energy storage device when the accident-induced force is introduced at the fastening point of the body for the support element.

9 Claims, 4 Drawing Sheets

(56) References Cited

U.S. PATENT DOCUMENTS

| | | | | |
|---|---|---|---|---|
| 2013/0026786 | A1* | 1/2013 | Saeki | B60K 1/04 |
| | | | | 296/187.08 |
| 2014/0017546 | A1* | 1/2014 | Yanagi | H01M 10/613 |
| | | | | 429/120 |
| 2015/0239331 | A1* | 8/2015 | Rawlinson | B62D 21/157 |
| | | | | 180/68.5 |
| 2016/0006008 | A1* | 1/2016 | Volz | H01M 50/224 |
| | | | | 429/61 |
| 2016/0311301 | A1* | 10/2016 | Ikeda | B62D 29/001 |
| 2016/0347160 | A1* | 12/2016 | Landgraf | B60L 50/66 |
| 2017/0088181 | A1* | 3/2017 | Tsukada | B62D 25/2018 |
| 2017/0217297 | A1* | 8/2017 | Li | B62D 29/008 |
| 2017/0240207 | A1* | 8/2017 | Kido | H01M 50/24 |
| 2018/0127032 | A1* | 5/2018 | Atsumi | B62D 25/20 |
| 2019/0232773 | A1* | 8/2019 | Kasai | B62D 21/157 |

FOREIGN PATENT DOCUMENTS

| | | | |
|---|---|---|---|
| CN | 102897010 | A | 1/2013 |
| CN | 103538456 | A | 1/2014 |
| CN | 104340282 | A | 2/2015 |
| CN | 105144425 | A | 12/2015 |
| CN | 105848943 | A | 8/2016 |
| CN | 108058749 | A | 5/2018 |
| DE | 10 2012 000 622 | A1 | 7/2013 |
| DE | 10 2016 118 108 | A1 | 3/2017 |
| DE | 11 2015 004 834 | T5 | 7/2017 |
| DE | 10 2017 007 406 | A1 | 2/2019 |
| EP | 2 468 609 | A2 | 6/2012 |
| JP | 2008-174181 | A | 7/2008 |
| JP | 2010-100207 | A | 5/2010 |
| JP | 2012-56395 | A | 3/2012 |
| JP | 2017-204386 | A | 11/2017 |
| WO | WO 2015/113579 | A1 | 8/2015 |

OTHER PUBLICATIONS

International Search Report (PCT/ISA/210) issued in PCT Application No. PCT/EP2020/079146 dated Jan. 29, 2021 with English translation (five (5) pages).

Japanese-language Written Opinion (PCT/ISA/237) issued in PCT Application No. PCT/EP2020/079146 dated Jan. 29, 2021 (six (6) pages).

German-language Search Report issued in German Application No. 10 2019 127 942.9 dated May 18, 2020 with partial English translation (11 pages).

* cited by examiner

BODY FOR AN ELECTRICALLY OPERABLE MOTOR VEHICLE

BACKGROUND AND SUMMARY

The invention relates to a vehicle body for an electrically operable motor vehicle with a vehicle floor which has a floor element arranged above an energy storage device, in the region of the end of which vehicle floor at least one fastening point of the vehicle body is provided for a carrier element.

EP 2 468 609 A2 has already disclosed a vehicle body of this type with a vehicle floor, which vehicle body has a floor element above a housing of an energy storage device. Here, respective fastening points of the vehicle body are usually formed in the region of the front end of the vehicle floor for carrier elements, in particular a frame construction for a front axle.

If, for example, accident-induced force loading and rearward displacement of respective carrier elements of the frame construction or axle members of the front axle occur as a consequence of a frontal collision, corresponding buckling can occur in the region of the floor panel or the floor element of the vehicle floor as a result of the input of load into the vehicle floor. There is the risk here that battery cells or battery modules of the energy storage device are damaged if the buckling takes place in the direction of the energy storage device.

It is therefore an object of the present invention to provide a vehicle body of the type mentioned at the outset, in the case of which the risk of damage of the energy storage device is reduced considerably in the case of a corresponding input of load into the respective floor element of the vehicle floor.

According to the invention, this object is achieved by way of a vehicle body with the features of the independent claim. Advantageous refinements with favorable developments of the invention are specified in the dependent claims.

The vehicle body according to the invention has a vehicle floor arranged above a corresponding energy storage device, in the region of the, in particular, front end of which vehicle floor at least one fastening point of the vehicle body is provided for a carrier element, in particular for a carrier element of a frame construction of the vehicle, and which vehicle floor comprises at least one floor element in the form of a floor panel or the like above the energy storage device. In order then, in the case of an accident-induced input of load of a corresponding force in the region of the fastening point, as can be the case, for example, in the event of a frontal collision or a side-on collision of the vehicle in the region of the axle attachment or the like, to avoid accompanying damage of the energy storage device, it is provided according to the invention that the floor element has a deformation region which can be deformed in a targeted manner away from the energy storage device in the case of an accident-induced introduction of force at the fastening point of the vehicle body for a carrier element.

Accordingly, the floor element of the vehicle floor is provided with a deformation region which is deformed and moved in a targeted manner away from the respective battery cells or battery modules of the energy storage device in the case of an accident-induced introduction of force or an accident-induced introduction of load. As a result, a penetration of the floor element into the energy storage device can be avoided and therefore a considerable source of danger during the operation of vehicles with an electric drive can be eliminated. Along with this, complicated measures which have been required up to now to avoid damage of this type can be dispensed with.

In this context, it has been shown to be particularly advantageous if the deformation region can be deformed away from the energy storage device upward in the vehicle vertical direction. Empirically, the energy storage device can be protected particularly reliably in this way against damage by the corresponding floor element of the vehicle floor.

In order to achieve a corresponding deformation of the respective floor element, it has been shown to be particularly advantageous in a further refinement of the invention if the deformation region is configured so as to be curved upward in the vehicle vertical direction. In this way, the deformation region of the floor element is already pre-shaped in a targeted manner such that an accident-induced introduction of force or an introduction of load which usually takes place, for example, horizontally in the vehicle longitudinal direction and/or in the vehicle transverse direction can be converted in an optimum way into a corresponding deformation of the floor element in the vehicle vertical direction.

In a further advantageous refinement of the invention, the deformation region of the corresponding floor element is formed by way of at least one bead which projects upward in the vehicle vertical direction. By way of an upwardly projecting bead of this type, a force in the vehicle longitudinal direction and/or in the vehicle transverse direction as a result of an input of load can likewise be converted in a particularly favorable way into a corresponding deformation upward in the vehicle vertical direction.

In this context, it has been shown to be advantageous, furthermore, if the corresponding bead extends at least substantially in the vehicle transverse direction, with the result that a targeted deformation of the floor element can be achieved over, for example, the entire vehicle width regardless of the precise position of the input of load.

It has likewise been shown to be advantageous in this context, furthermore, if the bead is of triangular or arcuate configuration in cross section. Defined deformation and energy absorption properties of the floor element can be set particularly favorably by way of the two shapes.

A further advantageous refinement of the invention provides that the floor element of the vehicle floor is configured as a housing part of a store housing of the energy storage device. In other words, the floor element or the vehicle floor can be provided above a closed store housing of the energy storage device. In this case, the deformation region according to the invention of the floor element ensures that no damage can occur, in particular, to an upper shell of the store housing and, as a consequence, no damage to the respective battery cells or battery modules of the energy storage device can occur either. As an alternative to this, however, the corresponding floor element, comprising the deformation region, of the vehicle floor can also be configured as, for example, an upper shell or housing element or the like of the store housing of the energy storage device itself. This has the advantage that the floor element or the vehicle floor then has a dual function, namely firstly delimiting the passenger compartment at the bottom and secondly forming a part of the store housing of the energy storage device. The deformation region than ensures even in this case that the floor element is moved away from the respective battery cells and battery modules in the case of accident-induced loading of force and a corresponding input load, in order not to damage these battery cells and battery modules.

As has already been explained, the refinement according to the invention of the floor element is particularly suitable, in particular, in the immediate vicinity of a fastening point or bearing point of a front axle of the vehicle. It is to be considered to also be included within the context of the invention, however, that the corresponding deformation region can also be provided at another point of the floor element of the vehicle floor, in order for it to be possible, in particular, for respective inputs of load which occur as a consequence of a frontal collision and/or a side-on collision to be converted in such a way that the respective floor element of the vehicle floor is moved away from the energy storage device, in particular upward in the vehicle vertical direction, in order to avoid corresponding damage of respective battery cells or battery modules.

Further features of the invention result from the claims, the figures and the description of the figures. The features and combinations of features mentioned above in the description and the features and combinations of features mentioned in the following text in the description of the figures and/or shown solely in the figures can be used not only in the respective specified combination, but rather also in other combinations or on their own.

The invention will now be described in greater detail on the basis of one preferred exemplary embodiment and with reference to the drawings.

DETAILED DESCRIPTION OF THE DRAWINGS

Figure 1:
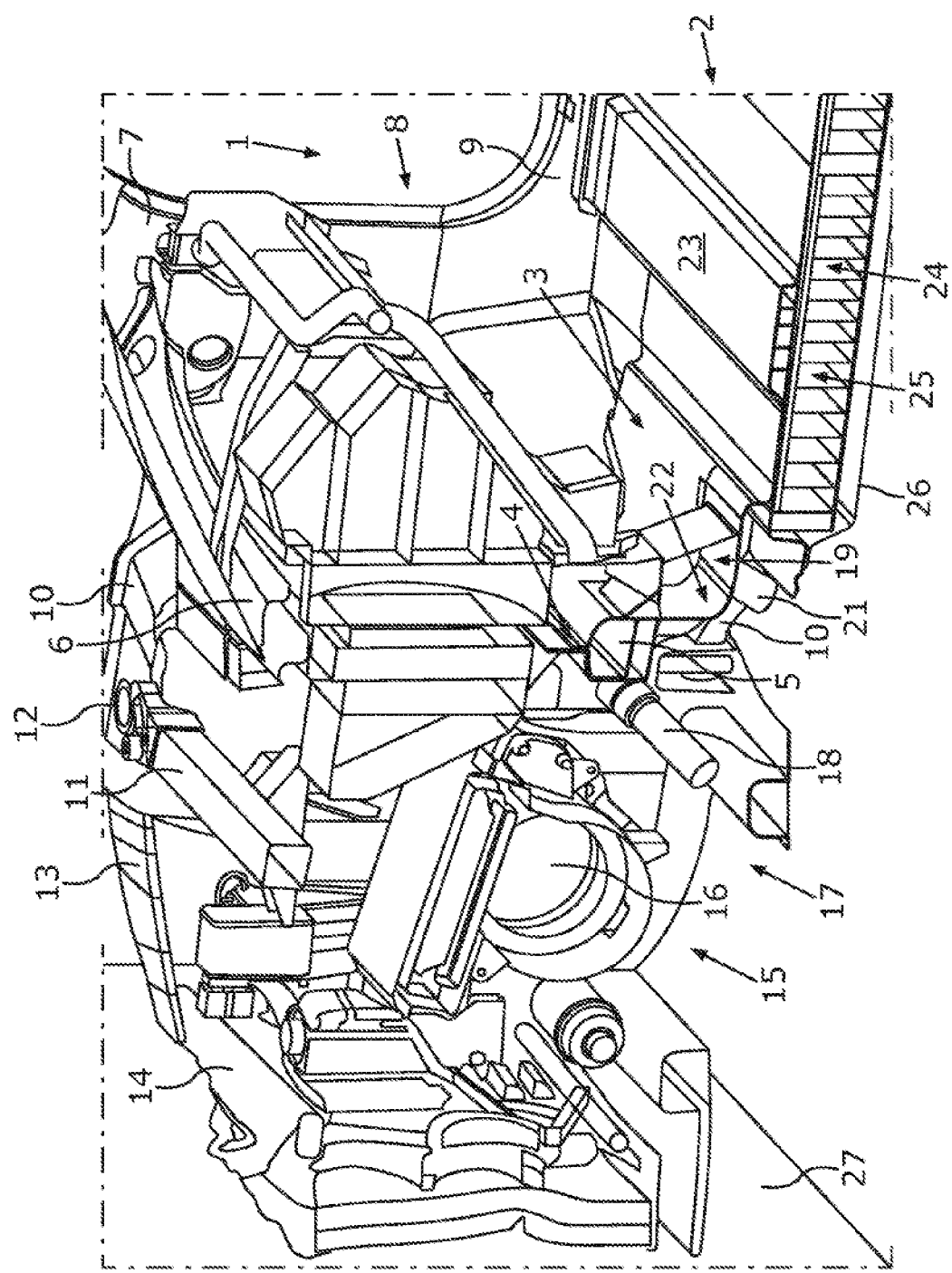
FIG. 1 shows details of a perspective side view of a vehicle body for an electrically operable passenger car in the region of the front vehicle part and the rearwardly adjoining passenger compartment during a frontal collision with a barrier. A frame construction serves as a motor mount and as a front axle carrier and has at least one carrier element which is fixed in the region of a front end of the vehicle floor via at least one fastening point to the vehicle body.

FIG. 1 shows details of a perspective sectional view of a vehicle body for an electrically operable passenger car. Here, in particular, a front region of a passenger compartment 1 can be seen which is delimited toward the bottom by way of a vehicle floor 2 which, toward the front, comprises a pedal floor panel 3 and then merges into a front bulkhead 4 which is delimited on the lower side by way of a lower bulkhead crossmember 5. Toward the top, the bulkhead 4 is delimited by way of an upper bulkhead crossmember 6 which, moreover, forms a windshield frame together with respective A-pillars 7 and a roof crossmember which cannot be seen. Here, the A-pillars 7 are configured as parts of a side wall 8 which, in addition to these A-pillars 7, also comprises respective side sills, by way of which the vehicle floor 2 is delimited on the outer side.

The passenger compartment 1 is adjoined toward the front by a front vehicle part structure 9, of which, in the present case, only a wheel arch shell part 10 of the right-hand (as viewed in the forward driving direction the present case) front wheel can be seen, and a damper strut brace 11 which connects respective spring strut domes 12 of the respective wheel arch shell part 10 to one another per vehicle side. Furthermore, a longitudinal beam part 13 of an upper longitudinal beam plane can be seen, which longitudinal beam part 13 is connected on the front side via a cross bridge 14 to the corresponding longitudinal beam part 13 on the other vehicle side. Further longitudinal beams, in particular of a middle or main longitudinal beam plane, cannot be seen in the present case, but are usually present.

In the present case, an electric motor 16 of an electric drive 15 for operating the car can be seen, which electric motor 16 is supported by way of a frame construction 17. Moreover, a front axle 18 is also supported by way of this frame construction 17.

This frame construction 17 is fastened, inter alia, via at least one fastening point 19 to the vehicle body of the car, which fastening point is provided in the present case in the region of the front end of the vehicle floor 10. More precisely, a carrier element 20 of the frame construction 17 is arranged here via a bush 21 which is provided on the end side on a corner construction 22 in the region of the vehicle center, this corner construction 22 extending between the lower bulkhead crossmember 5 and the front end of the vehicle floor 2.

The vehicle floor 2 comprises a floor element 23 which delimits the passenger compartment 1 toward the bottom and separates it from an energy storage device 24 which is arranged on the lower side of the floor element 23 or the vehicle floor 2 and comprises a multiplicity of battery cells or battery modules 25. Here, in the present case, the energy storage device 24 is accommodated in a separate store housing 26 which is arranged on the lower side of the floor element 23. It is also contemplated here in one particular embodiment that the floor element 23 forms the upper part of the store housing 26 and is connected in a gas-tight manner to one or several lower parts in order to form the store housing 26. In other words, the floor element 23 can be arranged either on the upper side of a store housing 26, which is closed per se, or can itself be part of this store housing 26 by it forming this store housing 26 together with further housing parts which are arranged on the lower side of the floor element 23.

Inter alia, the electric motor 16 can be supplied with electrical energy by means of the energy storage device 24, with the result that the present car can be operated, for example, purely electrically (BEV) or as a hybrid vehicle (PHEV).

Finally, it can be seen from FIG. 1 that, in the present case, the vehicle body is shown at the beginning of a frontal collision with an obstacle 27, as a result of which, inter alia, in the region of the fastening point 19 of the carrier element 20 of the frame construction 17, accident forces are introduced in a way which will also be described in greater detail in the further text into the vehicle body, in particular in the region of the vehicle floor 2.

Figure 2A:
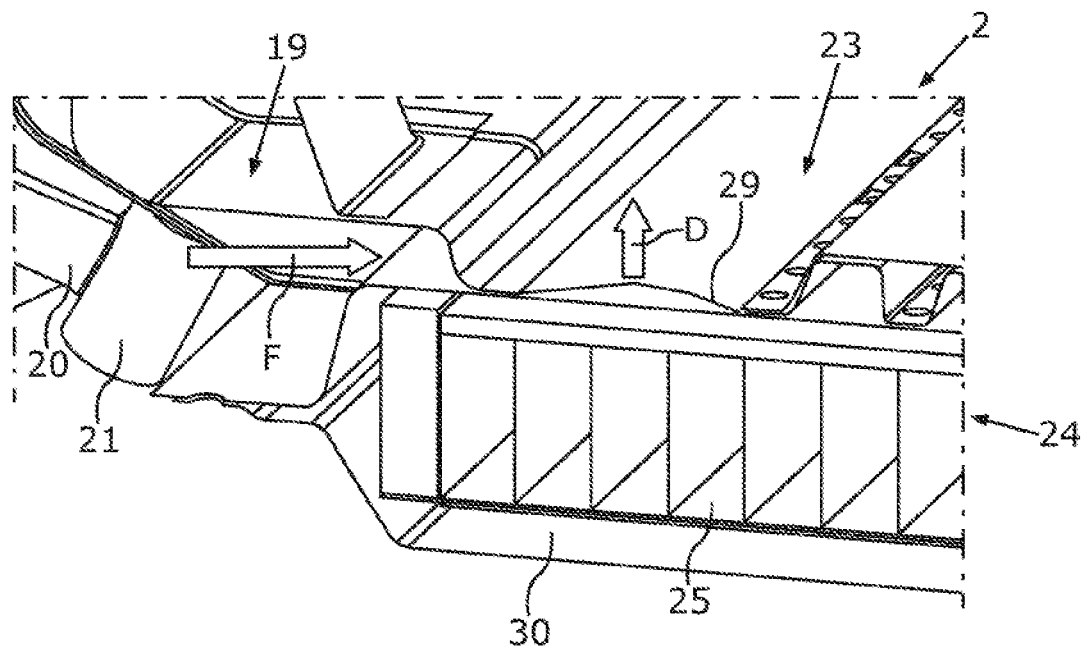
FIGS. 2a-c show respective details of an enlarged, perspective sectional view of the region of the fastening point of the carrier element of the frame construction which acts as a motor mount and front axle carrier in the region of the front end of the vehicle floor. An upper floor panel or floor element has a deformation region which can be deformed in a targeted manner away from an energy storage device below the vehicle floor in the case of an accident-induced introduction of force at the fastening point as a consequence of the frontal collision which can be seen in FIG. 1. A course of this targeted deformation is schematically indicated on the basis of FIGS. 2a-c.
Figure 2B:
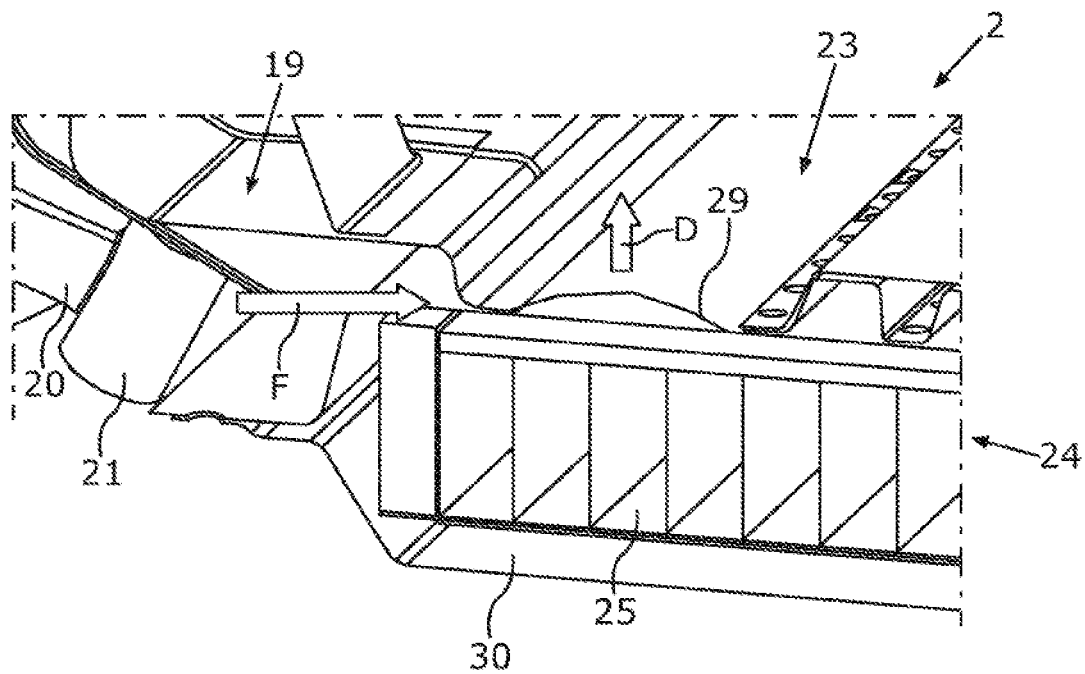
Figure 2C:
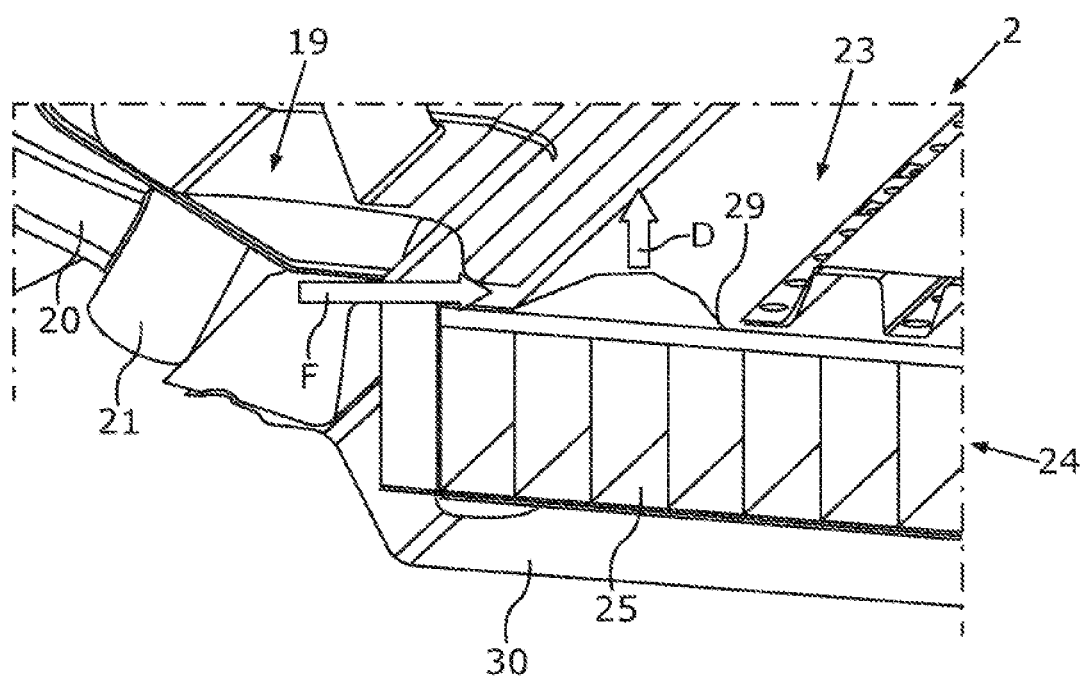

FIGS. 2a to 2c in each case show details of an enlarged and perspective sectional view of the vehicle body of the car according to FIG. 1 in the region of the fastening point 19 of the frame construction 17 in the region of the front end of the vehicle floor 2 and in the region of the described corner construction 22. As has already been explained in conjunction with FIG. 1, a frontal collision of the car by way of its front vehicle part 28 leads, for example, via the fastening point 19 of the vehicle body in the region in front of the front end of the vehicle floor 2 to the introduction of a force F which, in the present case, acts at least substantially in the vehicle longitudinal direction. Here, as can be seen, in particular, from FIG. 2a, this force F acts to a very particular extent on the floor element 23 of the vehicle floor 2, to be precise in a front end region of the vehicle floor 2.

In order to then avoid that, as a consequence of an undesired deformation of the floor element 23, the latter moves in the direction of the respective battery modules 25 of the energy storage device 24, that is to say, in the present case, moves substantially downward in the vehicle vertical direction, a deformation region 29 of the floor element 23 is provided in the present case, which floor element 23 deforms in a targeted manner away from the energy storage device 24 or the battery modules 25 in the case of the mentioned accident-induced introduction of force at the fastening point 19 by way of a correspondingly high force F, to be precise upward in the vehicle vertical direction (z-direction) in the present case. This is indicated in FIGS. 2a to 2c by way of a respective arrow D.

Here, FIGS. 2a to 2c show the sequence of this deformation according to the arrow D in the course of the frontal collision. This means that a beginning deformation of the deformation region 29 of the floor element 23 can be seen in FIG. 2a, which deformation intensifies and increases in FIG. 2b and, in the further course, in FIG. 2c. Accordingly, the deformation D according to FIG. 2c has the greatest elevation or spacing of the deformation region 29 at the end of the frontal collision of the car. It can be seen here, in particular, that no contact occurs between the floor element 23 and the energy storage device 24 as a consequence of the deformation of the deformation region 29, which contact might cause damage to the energy storage device 24. Rather, the floor element 23 is moved upward away from the energy storage device 24 in the vehicle vertical direction (z-direction) in the deformation region 29.

Figure 3A:
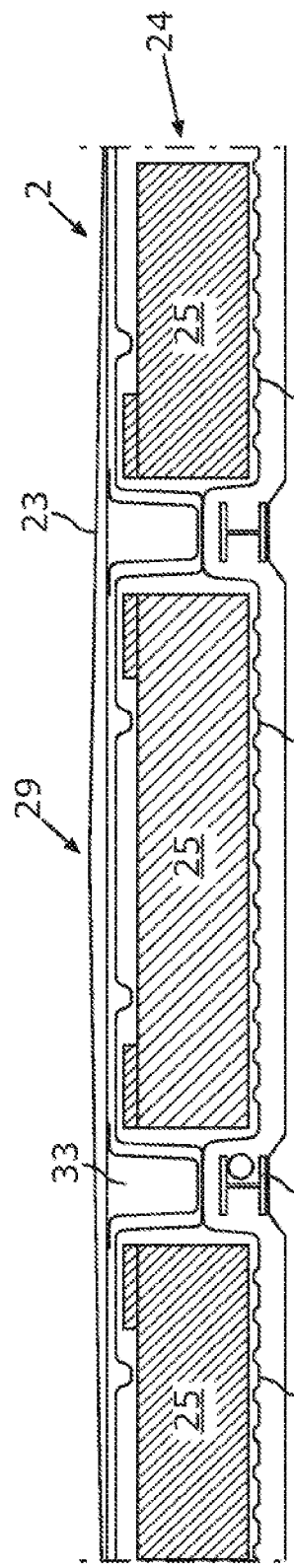
FIGS. 3a-c show respective details of sectional views along a sectional plane, running in the vehicle longitudinal direction and in the vehicle vertical direction, through the floor element of the vehicle floor and the energy storage device which is arranged below the vehicle floor. Three variants of the configuration of the respective deformation region of the floor element are illustrated on the basis of FIGS. 3a-c.
Figure 3B:
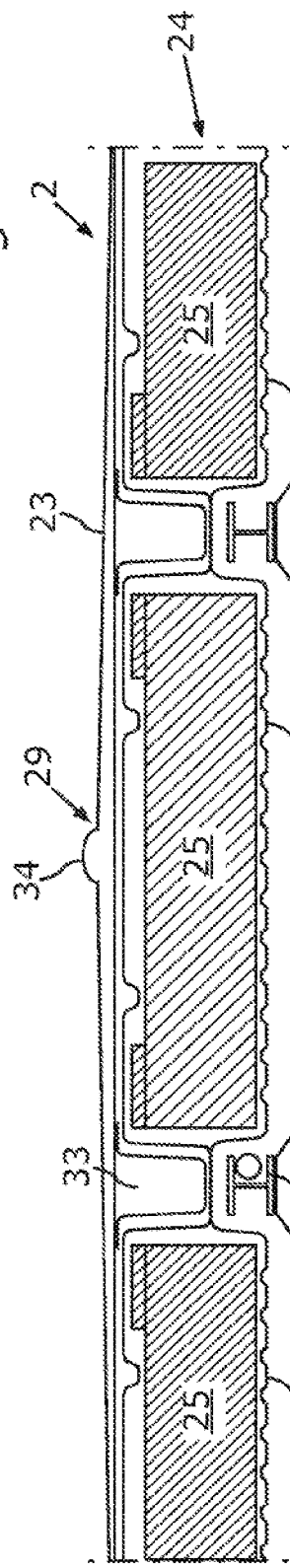
Figure 3C:
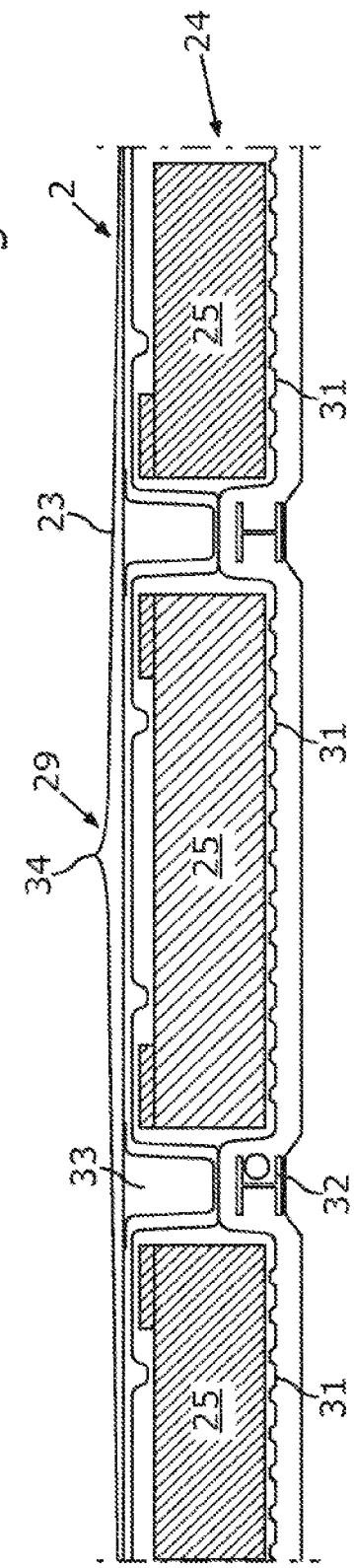

FIGS. 3a to 3c show details of a respective sectional view of possible variants and embodiments of the mentioned deformation region 29 of the floor element 23. Here, the respective sectional view shows the vehicle floor 2 or its floor element 23 and the energy storage device 24 arranged below it, along a respective sectional plane which runs in the vehicle longitudinal direction (x-direction) and in the vehicle vertical direction (z-direction).

It can be seen first of all here that, in the present case, the floor element 23 or the vehicle floor 2 forms an upper-side housing part of the store housing 26, which upper-side housing part is connected in a gas-tight manner to a lower housing part 30 in the form of a lower-side floor panel in order to form the store housing 26. The respective battery modules 25 are arranged within this store housing which is formed by way of the floor element 23 and the housing part 30, which battery modules 25 for their part are arranged within respective individual housings 31. Corresponding bars 32 or spacer elements 33, via which the floor panel 30 is connected to the floor element 23, are arranged between the individual housings 31.

As an alternative to this, however, it would also be conceivable, as has already been explained above, for a separate store housing 26 to be provided which is arranged on the lower side of the floor element 23; whereas, in the present exemplary embodiment, the floor element 23 therefore has a dual function, namely firstly to delimit the passenger compartment 1 toward the bottom and secondly to form the upper part of the store housing 26, it would accordingly also be conceivable that the store housing has, in one piece or multiple pieces, an upper part which is separate from the floor element 23 and, by means of the lower-side housing part 30, forms the store housing for accommodating the respective battery modules 25 of the energy storage device 24.

Different constellations of the respective deformation region of the floor element 23 are now shown on the basis of FIGS. 3a to 3c.

In the variant according to FIG. 3a, the deformation region 29 here is configured so as to be curved upward in the vehicle vertical direction, with the result that, in the deformation region 29, it is at a greater spacing from the battery module 25 arranged below it than in front of or behind this deformation region 29 in the vehicle longitudinal direction (x-direction).

In the case of the variants according to FIGS. 3a and 3b, a bead 34 which projects upward in the vehicle vertical direction is provided, which bead 34 is of substantially arcuate configuration according to FIG. 3b and is of substantially triangular configuration in cross section in the variant according to FIG. 3c. Here, both the deformation region 29 according to FIG. 3a and the beads according to FIGS. 3b and 3c extend in each case at least substantially in the vehicle transverse direction (y-direction) and horizontally, for example over the at least approximately entire vehicle width.

The present deformation regions 29 serve primarily, in the case of a frontal collision, that is to say in the case of an introduction of force with a force component F which acts substantially toward the rear in the vehicle longitudinal direction (x-direction), to achieve a deformation of the deformation region 29 away from the energy storage device 24, that is to say in the vehicle vertical direction (z-direction) in the present case. Nevertheless, it would also be possible for the present invention to be applied to side-on collisions. In this case, it would be conceivable, in particular, for respective deformation regions 29 or beads 34 to be used which then extend, for example, in the vehicle longitudinal direction (x-direction) along a corresponding side sill or the like.

LIST OF DESIGNATIONS

1 Passenger compartment
2 Vehicle floor
3 Pedal floor panel
4 Front bulkhead
5 Lower bulkhead crossmember
6 Upper bulkhead crossmember
7 A-pillar
8 Side wall
9 Front vehicle part structure
10 Wheel arch shell part
11 Damper strut brace
12 Spring strut dome
13 Longitudinal beam part
14 Cross bridge
15 Electric drive 16 Electric motor
17 Frame construction
18 Front axle
19 Fastening point
20 Carrier element
21 Bush
22 Corner construction
23 Floor element
24 Energy storage device
25 Battery module
26 Store housing
27 Obstacle
28 Front vehicle part
29 Deformation region
30 Housing part
31 Individual housing
32 Bar
33 Spacer element
34 Bead
D Arrow
F Force

What is claimed is:

1. A vehicle body for an electrically operable motor vehicle, comprising:
a vehicle floor having a floor element arranged above an energy storage device;
at least one fastening point of the vehicle body for a carrier element provided in a region of the vehicle floor, wherein
the floor element has a deformation region which is deformable in a targeted manner away from the energy storage device in an event of an accident-induced introduction of force at the fastening point of the vehicle body for the carrier element,
the deformation region is deformable away from the energy storage device upward in a vehicle vertical direction, and
the deformation region is formed by way of at least one bead which projects upward in the vehicle vertical direction, and
the bead extends at least substantially in a vehicle transverse direction.

2. The vehicle body according to claim 1, wherein the deformation region is configured so as to be curved upward in the vehicle vertical direction.

3. The vehicle body according to claim 1, wherein the bead is of triangular configuration in cross section.

4. The vehicle body according to claim 1, wherein the bead is of triangular configuration in cross section.

5. The vehicle body according to claim 1, wherein the bead is of arcuate configuration in cross section.

6. The vehicle body according to claim 1, wherein the bead is of arcuate configuration in cross section.

7. A vehicle body for an electrically operable motor vehicle, comprising:
a vehicle floor having a floor element arranged above an energy storage device;
at least one fastening point of the vehicle body for a carrier element provided in a region of the vehicle floor, wherein
the floor element has a deformation region which is deformable in a targeted manner away from the energy storage device in an event of an accident-induced introduction of force at the fastening point of the vehicle body for the carrier element, and
the floor element of the vehicle floor is configured as a housing part of a store housing of the energy storage device.

8. A vehicle body for an electrically operable motor vehicle, comprising:
a vehicle floor having a floor element arranged above an energy storage device;
at least one fastening point of the vehicle body for a carrier element provided in a region of the vehicle floor, wherein
the floor element has a deformation region which is deformable in a targeted manner away from the energy storage device in an event of an accident-induced introduction of force at the fastening point of the vehicle body for the carrier element, and
the fastening point of the vehicle body is provided for the carrier element in a front end region of the vehicle floor.

9. A vehicle body for an electrically operable motor vehicle, comprising:
a vehicle floor having a floor element arranged above an energy storage device;
at least one fastening point of the vehicle body for a carrier element provided in a region of the vehicle floor, wherein
the floor element has a deformation region which is deformable in a targeted manner away from the energy storage device in an event of an accident-induced introduction of force at the fastening point of the vehicle body for the carrier element,
the deformation region is deformable away from the energy storage device upward in a vehicle vertical direction, and
the deformation region is formed by way of at least one bead which projects upward in the vehicle vertical direction, and
the fastening point of the vehicle body is provided for the carrier element of a front axle.

* * * * *